United States Patent [19]
Tachibana et al.

[11] 3,894,277
[45] July 8, 1975

[54] CONTROL DEVICE FOR THE COMMUTATORLESS MOTOR

[75] Inventors: Kyozo Tachibana; Yoshio Okumura, both of Katsuta, Japan

[73] Assignee: Hitachi, Ltd., Japan

[22] Filed: Oct. 10, 1973

[21] Appl. No.: 404,893

[30] Foreign Application Priority Data
Oct. 13, 1972 Japan............................ 47-102486

[52] U.S. Cl..................................... 318/138; 318/171
[51] Int. Cl. ............................................. H02k 29/00
[58] Field of Search ............ 318/138, 171, 227, 254

[56] References Cited
UNITED STATES PATENTS
3,612,973  10/1971  Kuniyoshi...................... 318/138 X
3,696,277  10/1972  Liska et al. ......................... 318/138

Primary Examiner—G. Z. Rubinson
Attorney, Agent, or Firm—Craig & Antonelli

[57] ABSTRACT

A commutatorless motor comprises a synchronous motor, a thyristor power converter to supply an electric power to the synchronous motor, an AC or DC power source to supply an electric power to the thyristor power converter, control means to supply control signals to the gate of the thyristor used in the thyristor power converter, a mechanical distributor to supply a distribution signal to the control means when the synchronous motor starts and is running at low speed, an electric distributor to supply to the control means a distribution signal whose advance angle may be variable when the motor runs at a speed higher than a predetermined speed, and a device for switching said control means between the distributors.

7 Claims, 3 Drawing Figures

MOTOR SPEED

F I G. 3
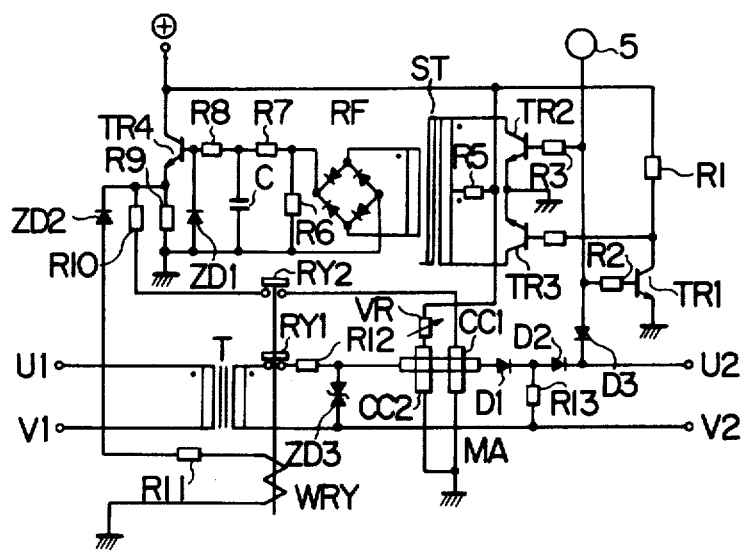

3,894,277

CONTROL DEVICE FOR THE COMMUTATORLESS MOTOR

BACKGROUND OF THE INVENTION

1. Field of the Invention

The present invention relates to a control device for the commutatorless motor. The commutatorless motor comprises a synchronous motor and a thyristor power converter (hereinafter refered to as a thyristor motor). According to this invention, there is provided a device to control the advance angle $\gamma$ of the distributing signal of the thyristor power converter in accordance with the motor speed.

2. Description of the Prior Art

There has been a control device for the commutatorless motor in which the advance angle $\gamma$ of the distribution signal is varied in a stepwise manner (e.g., two steps). That is to say, in such device, the control advance angle is held small at a starting time in order to obtain a large starting torque of the synchronous motor while the advance angle $\gamma$ is made large when the motor speed increases to a predetermined value in order to obtain an angular margin for commutation control. However, this control device has disadvantages. As the control advance angle $\gamma$ increases abruptly, the motor torque sharply declines. Since the counter electromotive force of the motor suddenly goes down, the armature current of the motor goes up temporarily. Thus, in this control device an instability occurs in the operation of the motor.

There has been another control device for the commutatorless motor in which a mechanical distributor and an electric distributor are provided and the distribution signals derived form the distributors are selectively used in accordance with the motor speed. The disadvantage of such control device is that since the selection of the distribution signals, or the switching operation thereof, can not be performed smoothly, the motor torque can not be fully exerted.

SUMMARY OF THE INVENTION

An object of the present invention is to effectively exploit the motor torque over the period from the starting stage of the motor to a high speed stage thereof thereby to attain a stability of the motor running.

One of the features of the present invention is that the advance angle $\gamma$ of the distribution signal is controlled in accordance with the motor speed. That is, the advance angle $\gamma$ of the distribution signal is kept small at a low speed stage or at a starting time of the motor, in order to obtain a large starting torque. As the motor speed increases, the advance angle $\gamma$ of the distribution signal is made large not so as to reduce the torque generated form the motor. When the motor speed reaches a predetermined high level, the advance angle $\gamma$ of the distribution signal is made large not so as to fail to make a commutation of a load commutation while at the same time the control advance angle is made such that it is not related with the change of the motor speed, so as to generate motor torque as large as possible.

Another feature of the present invention is that, at the starting time of the motor or at the low speed stage thereof, the distribution signal is used from the mechanical distributor while, at the high speed stage, the distribution signal is used from the electrical signal, and the switching operation of both the distribution signals are done smoothly.

Other objects and features of the instant invention will become apparent upon a careful consideration of the following description when taken in conjunction with the accompanying drawings.

BRIEF DESCRIPTION OF THE DRAWINGS

FIG. 3 is a circuit diagram of the control device for the commutatorless motor according to the present invention.

DESCRIPTION OF THE PREFERRED EMBODIMENT

Figure 1:
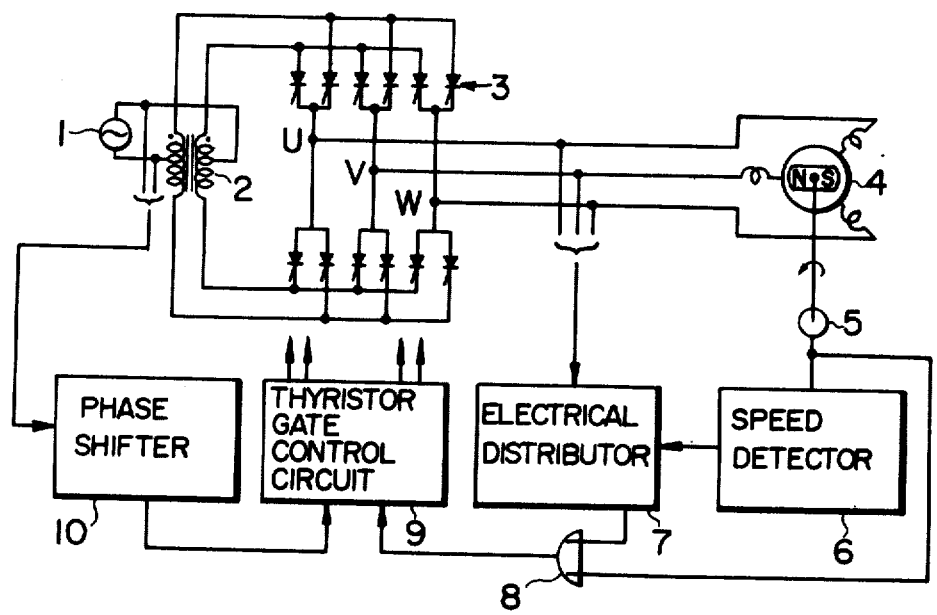
FIG. 1 is a schematic circuit diagram in which a thyristor motor of cycloconverter type and its control device are incorporated.

FIG. 1 is a schematic circuit diagram of the control device according to this invention in which a thyristor motor of cycloconverter type and its control circuit are illustrated.

In FIG. 1, the reference numeral 1 designates an AC Power source, the reference numeral 2 a smoothing reactor, the numeral 3 a thyristor converter of cycloconvertor type, the numeral 4 a synchronous motor, the numeral 5 a mechanical distributor directly coupled to the rotor shaft of the synchronous motor 4, the reference numeral 6 a speed detector, the reference numeral 7 an electrical distributor whose distribution signal is obtained from the induced voltage of the synchronous motor 4, the reference numeral 8 a switch for both the distributors, the reference numeral 9 a thyrister gate control circuit, and the reference numeral 10 represents a phase shifter for controlling the output voltage of the thyristor converter.

The current from the AC power source 1 is supplied to the terminals of the synchronous motor 4 by way of the smoothing reactor 2 and the thyristor converter 3. The thyristor gate control circuit 9 which serves to supply a gate signal to the thyristor converter, is to control the firing sequence of the thyristors and the power supply to the synchronous motor. The gate signal is derived from an AND circuit to which the distribution signal from the mechanical distributor 5 of the electrical distributor 7 and a synchronous signal from the phase shifter 10 for the output voltage control are supplied.

An explanation is given below as to the principle of the present invention.

The relationship between the torque $\tau$ of the thyristor motor and the advance angle $\gamma$ of the distribution signal, if the motor is running at a speed, is mathematically written $$\tau \alpha \cos |\gamma|$$

This expression shows that the motor torque $\tau$ becomes smaller as the advance angle $\gamma$ of the distribution signal becomes larger. The advance angle $\gamma$ of the distribution signal is the advance angle of the ignition signal for the thyristor in relation to the counter electromotive force of the motor. It is desirable to make the advance angle of the distribution signal as small as possible in order that the torque of the motor may be effectively developed. However, there is a restriction in the effective developement of the motor torque because the thyristor in inherently has a commutation in property. When using the thyristor motor of cycloconverter type, the advance angle thereof of may be made small because the commutation depends on the alternation of the power voltage for the starting or low-speed operation of the motor. In case the advance angle γ is held constant, the time before the actual occurrence of the source commutation after the appearance of the distribution signal (which is a time duration measured in term of electrical angle of the induced voltage of the synchronous motor) is elongated as the motor speed increases. This is equivalent to the case where the control advance angle γ goes to a large negative value. Accordingly, it is necessary to increase the advance angle γ of the distributing signal in accordance with the increase of the motor speed in order that the reduction of the motor torque may be avoided. When the motor speed becomes high, a load commutation will occur almost without failure. Accordingly, a large advance angle of the distribution signal may be adapted to avoid the failure of the commutation. However, the increase of the advance angle results in the reduction of the motor torque. For this reason, it is better to maintain the advance angle at a constant value in order to obtain a torque as large as possible. The power source commutation means the commutation performed by the inter-phase voltage of the power source. The load commutation means the commutation performed by the inter-phase voltage of the synchronous motor.

Figure 2:
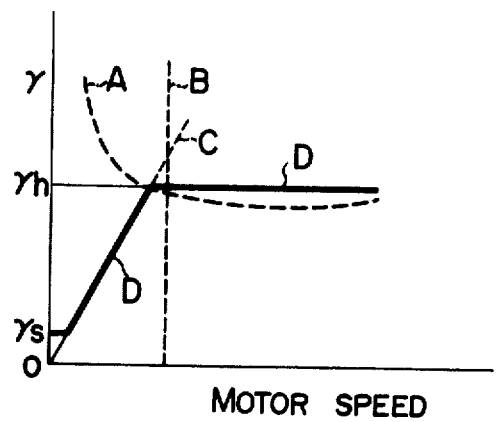
FIG. 2 illustrates the relation of the motor speed versus the advance angle of the distribution signal for explaining the principle of the present invention.

FIG. 2 is a torque speed-curve which illustrates the relation between the motor speed and the advance angle of the distribution signal for exploiting the motor torque effectively, and is specified by the above-described rquirements of the control system. In the drawing, the curve A shows a limitation of the load commutation, B is a maximum speed of the motor when the power source commutation is allowed, C shows the greatest lower band of the advance angle γ when the torque is not lowered at the power source commutation, and the line D shows an optimum condition of the angle γ which is obtained from the requirement for the angle γ to satisfy the requirements above mentioned and the operational conditions of the distributor. The principle of the present invention lies in that the angle γ is controlled along the line D.

Although the principle of the present invention has been described with reference to a thyristor motor of the cycloconverter type, it should be understood that the present invention may be applicable to other types of the thyristor motor. That is, nothing is changed except that the operation depending on the power source commutation in the thyristor motor of cycloconverter type is, in the other type of the thyristor motor, substituted by the operation of other commutation means substitutionally employed.

The operation of the device in FIG. 1 will be described below.

At the starting of the motor, a gate signal is produced in response to the distribution signal derived from the mechanical distributor and the synchronizing signal derived from the phase shifter for voltage control. The gate signal enables the thyristor converter 3 to operate. At this time, the advance angle γ of the distribution signal is maintained at small angles $γ_s$ in order to obtain the maximum starting torque. The reason why the mechanical distributor is used at the starting time of the motor, is that the electrical distributor operates insufficiently due to a small induced electromotive force of the synchronous motor 4 at this time.

As the speed of the synchronous motor increases to a given speed, the induced electromotive force of the synchronous motor increases enough to enable the electrical distributor to operate. Switching then is performed from the mechanical distributor to the electrical distributor. The necessity of the switching is due to the fact that the advance angle must be successively changed to become greater as the motor speed goes up, but the mechanical distributor is unable to change the advance angle γ in accordance with the motor speed. The electrical distributor 7 receives a speed signal from the speed detector 6, and successively increases advance angle γ of the distribution signal with an increase of the motor speed, and then transmits the distribution signal to the gate control circuit 9. It is one of features of the present invention that smoothing is attained in the switching from the mechanical distributor to the electrical distributor. An explanation will be made below about the reason why the smoothing is attained. The distribution signal from the mechanical distributor has a constant advance angle at the starting time of the motor. The advance angle of the signal from the electrical distributor becomes larger in accordance with the increase of the motor speed, and that signal leads in phase the distribution signal from the mechanical distributor. The gate signal is obtained as a logical product of the synchronizing signal from the phase shifter and the distribution signal, and is supplied to the thyristors of the thyristor converter. Accordingly, when the thyristors are once fired by the gate signal depending on the distribution signal of leading phase, they are not effected at all by the ensuing gate signal depending on the distribution signal. Thus, the switching from the mechanical distributor to the electrical distributor is completed.

When the motor 4 reaches the stage of high speed, the load commutation is performed. On this stage, it is necessary to increase the advance angle γ of the distribution signal so as to not fail to perform the commutation, while the advance angle γ must be maintained at constant value $γ_h$ so as to develop a motor torque as large as possible.

FIG. 3 is a circuit diagram to control the advance angle of the distribution signal. For the sake of convenience of explanation, the circuit in FIG. 3 is illustrated for the U-phase alone. Referring to FIG. 3, there is shown a circuit to produce a speed detecting signal in response to the signal from the mechanical distributor 5, a circuit of the electrical distributor, and a switching circuit between the mechanical distributor and the electrical distributor.

The speed detecting circuit is comprised of a group of transistors TR1, TR2 and TR3 to convert the signal from the mechanical distributor to an alternating signal, a saturable transformer ST receiving the alternating signal from the transistor group, a rectifier RF to rectify the output signal from the transformer ST, a smoothing circuit to smooth the rectified signal from the rectifer RF which consists of the resistors R6, R7 and R8 and a smoothing condensor C, a zener diode ZD1 to saturate the smoothed signal from the smoothing circuit, and a transistor TR4 to amplify the smoothed signal.

The electrical distributor is comprised of a transformer T, a relay WRY operable in response to a speed signal having an above predetermined value, and including contacts RY1 and RY2, a zener diode ZD2 to provide an operating level of the relay WRY, a wave shaping circuit including a resistor R12 and a zener diode ZD3, and a magnetic amplifier MA of self-feedback type having control windings CC1 and CC2, a diode D1 and a resistor R13.

The switching circuit for the distributors is comprised of an AND circuit comprising diodes D2 and D3.

An operation of the above mentioned circuits will be explained below.

The distribution signal from the mechanical distributor 5 is supplied to the terminals U2 and V2 through the diode D3, and also is supplied to the transistor TR2 through the base resistor R3. The distribution signal from the mechanical distributor 5 applied to the transistor TR1 through the base resistor R2 is inverted thereby, and the inverted signal is applied to the transistor TR3 through the resistor R2. The distribution signal from the mechanical distributor, thus, is converted into an alternating signal which in turn is applied to the saturable transformer ST. Since the integration of the voltage absorbed by the saturable transformer ST depends upon the specified designation of the core and the winding, a mean value of the half wave of the output voltage of the transformer is proportional to the frequency of the detected signal from the mechanical distributor. The output signal from the transformer is processed through the rectifier RF and the smoothing circuit, and then is amplified by the transistor TR4. The amplified signal is finally supplied to the control winding CC1 of the magnetic amplifier MA and the coil WRY of the relay. The induced voltage across the terminals U and V of the synchronous motor is applied to the electrical distributor by way of the transformer T. The speed signal which reaches a predetermined value, enables the zener diode ZD2 to conduct, and then causes the relay WRY to operate thereby closing the contacts RY1 and RY2. The induced voltage of the synchronous motor applied to the wave shaper via the closed contact RY1 is applied to the magnetic applifier MA. On the other hand, the speed signal is applied to the control winding CC1 via the resistor R10 and the contact RY2. Thus, as the synchronous motor speed increases, approaching to the magnetic saturation point is made more rapidly so that the distribution signal is advanced in the phase. The current from the power source via a variable resistor VR is supplied to the control winding CC2 for zero adjustment of the magnetic amplifier MA. The output signal from the magnetic amplifier is applied to the output terminals U2 and V2 through the diode D2 of the switching circuit. That is, at the starting time, the output signal from the mechanical distributor appears at the terminals U2 and V2 while at the predetermined motor speed, the distribution signal of the advanced phase from the electrical distributor appears at the output terminals. For details of the latter, when the motor speed reaches to a predetermined value, the contacts RY1 and RY2 are closed so that the distribution signal from the electrical distributor is allowed to reach the magnetic amplifier, and when the distribution signal from the electrical distributor is advanced in the phase from that of the mechanical distributor, the former distribution signal appears at the output terminals U2 and V2. Thus, the switching is smoothly performed from the mechanical distributor to the electrical distributor. The reason why the electric distributor is designed not to operate at the low speed stage is that it is necessary to avoid an unstableness of the operation thereof and preferable to use the magnetic amplifier of small capacity. At the high speed stage, the control advance angle of the distribution signal of the electrical distributor is maintained at a constant because the speed signal detected is saturated by the zener diode.

We claim:

1. A control device for a commutatorless motor comprising:
 a synchronous motor;
 a thyristor power converter for supplying electric power to said synchronous motor;
 control means for supplying control signals to the gates of said thyristor power converter; and distributing means for providing an advance angle of distribution signal to said control means, said distributing means including distribution signal means for maintaing an advance angle of said distribution signal at a small value during the starting time of the motor, said distribution angle means maintaining the advance angle of said distribution signal at a constant value regardless of the motor speed when the motor speed is higher than a predetermined high speed, and said distribution signal means continuously changing the advance angle of said distribution signal in accordance with the motor speed in an intermediate speed range between the motor speed at the starting time of the motor and the predetermined high speed.

2. A control device according to claim 1, wherein said distribution signal means maintain the advance angle of said distribution signal at a constant value during the starting time of the motor.

3. A control device according to claim 1, wherein said distributing means includes:
 a mechanical distributor directly coupled to the rotor shaft of said motor;
 an electrical distributor whose distributing signal is obtained from an induced voltage of the motor;
 a speed detector for supplying the motor speed signal to said electrical distributor;
 and a switching means for switching said mechanical distributor and said electrical connects alternately.
 mechanical 4. A control device according to claim 3, wherein said switching means connectes said mechanicala distributor for obtaining the distribution signal from said mechanical distributor at the starting time of the motor and connects said electrical distributor for obtaining the distribution signal from said electrical distributor when the advance angle of the distribution signal must be increased with an increase of the motor speed and when the advance angle of said distribution signal must be maintained at a constant value above the predetermined speed of the motor.

5. A control device according to claim 4, further comprising means for blocking the output signal of said electrical distributor at a predetermined low motor speed.

6. A control device according to claim 5, wherein said distribution signal means provides for a constant small value of the advance angle below the predetermined low motor speed of said motor.

7. A control device according to claim 1, wherein said thyristor power converter is capable of power source commutation.

\* \* \* \* \*